United States Patent
Watanabe et al.

(10) Patent No.: US 6,329,988 B1
(45) Date of Patent: Dec. 11, 2001

(54) PICTURE-DRAWING METHOD AND APPARATUS, AND RECORDING MEDIUM

(75) Inventors: Hiroyuki Watanabe; Mitsuhiro Shibuya, both of Tokyo (JP)

(73) Assignee: Seta Corporation, Tokyo (JP)

( * ) Notice: Subject to any disclaimer, the term of this patent is extended or adjusted under 35 U.S.C. 154(b) by 0 days.

(21) Appl. No.: 09/149,659

(22) Filed: Sep. 9, 1998

(30) Foreign Application Priority Data

May 25, 1998 (JP) .................................................. 10-142659

(51) Int. Cl.[7] .................................................. G06T 15/60
(52) U.S. Cl. .......................... 345/426; 345/427; 345/430; 345/431
(58) Field of Search .................................. 345/426, 430, 345/431, 427

(56) References Cited

U.S. PATENT DOCUMENTS

| | | | | |
|---|---|---|---|---|
| 5,305,430 | * | 4/1994 | Glassner | 345/427 |
| 5,488,700 | * | 1/1996 | Glassner | 345/426 |
| 5,566,283 | * | 10/1996 | Modegi et al. | 345/426 |

OTHER PUBLICATIONS

Foley et al. "Computer Graphics: Principle and Practice", (1996, chater 16, pp. 721–814).*

\* cited by examiner

Primary Examiner—Mark Zimmerman
Assistant Examiner—Kimbinh T. Nguyen
(74) Attorney, Agent, or Firm—Oliff & Berridge, PLC (57) ABSTRACT

A picture drawing method capable of expressing a three-dimensional feeling on a diffuse reflection surface of an object by considering indirect reflection from a ground surface with a simple algorithm. In this method, a diffuse reflection quantity a surface of the object receives from the ground surface at an angle between the normal vector of the object surface and the normal vector of the ground surface is calculated using a light quantity from a ground light source regarded as existing on the ground surface, an atmospheric damping coefficient and a distance between the object and the ground surface as parameters and stored in the form of a table. By specifying the parameter, the diffuse reflection quantity from the ground surface over the angular range of 0 to $\pi$ is obtained from the table. Further, an object luminous intensity which develops the color of the object on the object surface is obtained from the diffuse reflection quantity and an object diffuse reflection coefficient. In addition, an object luminous intensity which develops the color of the ground light source on the object surface is obtained from the diffuse reflection quantity.

6 Claims, 4 Drawing Sheets

PICTURE-DRAWING METHOD AND APPARATUS, AND RECORDING MEDIUM

BACKGROUND OF THE INVENTION

1. Field of the Invention

The present invention relates to a picture-drawing method and apparatus based upon a computer graphics (CG), and a recording medium, and more particularly to a picture-drawing method and apparatus, and a recording medium which are designed to readily and quickly provide a three-dimensional feeling to a diffuse reflection surface of an object so that they are suitably applicable to games.

2. Description of the Related Art

One of the problems with a picture created through the use of a CG technique is the lack of a three-dimensional feeling on a diffuse reflection surface (surface with less gloss). The principal reason why a human body drawn through the use of the CG looks unnaturally is that the skin of a human being constitutes a diffuse reflection surface.

It has been known that the factor to generate a three-dimensional feeling for the diffuse reflection surface is indirect reflected light (reflection) from a wall or floor (which will be referred hereinafter to as a ground surface. Since many picture-drawing algorithms do not take the indirect reflection into consideration, difficulty may be encountered to create a three-dimensional feeling on a diffuse reflection surface.

Although some picture-drawing algorithms, which give consideration to the indirect reflection, have been known as will be mentioned hereinbelow, they take a longer calculation time as compared with the picture-drawing algorithms not taking the indirect reflection into consideration, and hence, for example, difficulty may be experienced to apply them to the fields, such as games, where the real time is a significant factor.

(1) Prior Method Employed for Games without Considering Indirect Reflection

This prior method considers only one reflection on a surface of an object, and determines a diffuse and specular reflection in accordance with only the positional relationship between the surface and a light source, where the ambient light is treated as being constant. With this method, the three-dimensional feeling on the diffuse reflection surface is poor because of not taking the indirect reflection into consideration, but the processing speed is high to reduce the necessary memory.

(2) Ray Tracing

This algorithm is made to recursively trace the specular reflection on an object surface and the transmission through the interior of the object. This algorithm produces a relatively good result in a transparent body and a glossy surface, but provides a poor three-dimensional feeling. In addition, the processing speed is low and a considerably large scale of trace stack is necessary. In general, this algorithm is for producing a picture to be used for a commercial film or a picture to be recorded in an external storage such as a compact disk. As the picture on the compact disk there is used a picture previously processed without being processed in the real time.

(3) Radiosity

This algorithm regards an object surface as a light source and solves simultaneous equations describing an equilibrium condition of its interaction. Since this algorithm directly deals with the indirect reflection, a diffuse reflection surface with a three-dimensional feeling is obtainable. However, the picture-drawing speed becomes extremely low because of solving a large-scale of simultaneous equation, and a large amount of memory capacity is inevitable. Accordingly, this algorithm is not suitable for home-use games based upon a personal computer and requires an extremely long time for the picture-drawing processing. For this reason, this algorithm is actually for the business purposes., such as the simulation for a well-lighted room.

(4) Environment Mapping

The elements of an indirect reflection are stored as picture data so that the paste of an object surface reflection image takes place through the environment mapping technique. The use of a texture considering the indirect reflection allows a diffuse reflection surface with a three-dimensional feeling to be expressible. Since this algorithm is relatively simple, its processing speed is high, but a large-volume memory is necessary because of the use of the texture.

Meanwhile, of the light striking on an object, the light once reflected on a ground surface after emitted from a light source is referred to as indirect reflection (indirect reflected light), and this indirect reflection features the incidence from a variety of directions whereas the light from a common light source is incident from a specific direction. This is because the indirect reflection is composed of the diffuse reflection on a wide reflection surface such as a ground surface.

A further description will be made hereinbelow with reference to FIGS. 2A to 2E. FIGS. 2A to 2E are illustrations of the states where light from a light source is applied to a spherical object 1 from an upper left-hand direction. In cases where the indirect reflection from a ground surface strikes on the object 1, a specular reflection effect, which does not largely take place in the case of a common light source, develops on an extremely wide surface. This specular reflection effect signifies the development of the color of the light source. Since this effect only partially takes place in the case of the employment of a common light source, the highlight, that is, the portion developing the color of the light source, only appears in a small area, whereas the object the indirect reflection strikes on develops the color of the light source over a wide range to turn to a dim or mat color. The dim color means the mixture of the color of the object 1 and the color of the reflection (light source). Accordingly, of the surface of the spherical body, a partial surface 3 facing the ground surface displays the dim color (see FIG. 2B). FIG. 2B illustrates a real picture but not showing a picture based upon the CG.

This dim color is not expressible through the use of a prior algorithm considering only light coming from a specific direction. That is, the surface 3 on the side opposite to the light source is merely shaded with only block (see FIG. 2E). In FIGS. 2A to 2E, numeral 2 denotes a highlight formed on a surface being in opposed relation to the light source.

One possible solution to this problem seems to be additionally placing a light source on the ground surface side for the application of ordinary light thereto. However, even if the ordinary light is applied thereto from the ground surface side, difficulty is experienced to offer a dim color on the surface 3 of the object 1. What's worse, an unnatural highlight 4 appears (see FIG. 2D).

As mentioned before, the use of only the surface light source causes the opposite side surface to be dark while the addition of the light source makes the unnatural highlight. Thus, it may be considered to employ ambient light serving as a light source to exert the diffuse reflection effect at a constant degree over the entire surface for displaying the color of the object. However, if relying upon this ambient light, the dim color is still unobtainable (see FIG. 2C) although an improvement shows in that the surface 3 of the object 1 facing the ground surface becomes somewhat bright.

Particularly, in the prior simple algorithms, consideration is not given to that the color development of an object is made only with the color of a light source in the case of the use of a point light source or ambient light as the light source, the color development of the object depends upon both the properties of the light source and object, and hence, difficulty is encountered to display the dim color because of being subject to the influence of the property or nature of the object, so that the lack of the three-dimensional feeling occurs.

SUMMARY OF THE INVENTION

The present invention has been developed with a view to eliminating the problems inherent in the above-described prior art, and it is therefore an object of this invention to provide a picture-drawing method and apparatus which are capable of dealing with the indirect reflection from a ground surface through a simple algorithm to present a three-dimensional feeling on a diffuse reflection surface at a high processing speed with a small memory capacity.

A first aspect of this invention relates to a picture-drawing method in which light from a ground light source regarded or supposed as existing on a ground surface is adopted as the indirect reflection to be generated from the ground surface, and regardless of the property of an object, the ground light source has a property that the color development is made with two colors being the color of the object and the color of the light source, thus drawing a picture of the object while taking the light with this property into consideration.

The ground surface signifies a floor surface, a wall surface, a table surface or the like, and the object is a transparent body, an opaque body, a translucent body, an object with a mirror finished surface, an object with a diffuse reflection surface, or the like. Further, the indirect reflection is light coming from the ground surface to the object, and the ground light source means a surface light source on the assumption that the ground surface is an infinite plane. Still further, the property of the object mainly signifies its material, color or grain, and according to the kind of material, the light applied to the surface of the object produces the specular reflection or the diffuse reflection. Moreover, the property of the ground light source depends upon that the object has an attribute or that the light source has an attribute. This invention makes the light source side have a property whereby the color development takes place with a mixed color of the color of the object and the color of the light source.

If making the ground light source have the property that the color development occurs with the mixed color (dim color) of the color of the object plus the color of the light source, the object develops dim light due to the indirect reflection from the ground surface irrespective of the nature of the object. Whereupon, the employment of only the ground light source with the aforesaid property can create a realistic three-dimensional feeling on a diffuse reflection surface such as a skin of a human being.

A second aspect of this invention is to provide a picture-drawing method developed taking indirect reflection from a ground surface to an object. This picture-drawing method comprises a step of previously storing a diffuse reflection quantity, an object surface receives from the ground surface, in relation to an angle made between a unit normal vector of the object surface and a unit normal vector of the ground surface in the form of a table in a manner of using the quantity of light emitted from a ground light source regarded as existing on the ground surface, the atmospheric damping coefficient, the distance between the object and the ground surface and others as parameters, a step of obtaining the whole diffuse reflection quantity, the object surface receives from the ground surface over the range of the angle of 0 to $\pi$, from the table through the designation of one of the parameters so that the object develops its own color on the basis of the whole diffuse reflection quantity, an object diffuse reflection coefficient and the light quantity from the ground light source, which is one of the parameters, and a step of developing the color of the ground light source on the object on the basis of the whole diffuse reflection quantity and the light quantity from the ground light source.

Thus, by taking the indirect reflection coming from the ground surface to the object into consideration, a more realistic three-dimensional feeling on the object is feasible. The diffuse reflection quantity the object surface receives greatly varies in accordance with the angle $\theta$ made between the normal vector of the object surface and the normal vector of the ground surface. The angle $\theta$ is usually 0 to $\pi$, and $\theta=0$ signifies the case that the object surface is at a position opposite to the ground surface so that it does not receive the indirect reflection at all, whereas $\theta=\pi$ means the case that the object surface is in a parallel and opposed relation to the ground surface so that it is in the most bright condition. Although the quantity of light emitted from the ground light source regarded as existing on the ground surface is a function of $\theta$ because of varying the angle between the optical axis and the emission direction, usually, a constant value is used as that light quantity. As the light quantity from the ground light source increases, the diffuse reflection quantity also increases. On the contrary, as the light quantity decreases, the diffuse reflection quantity also decreases.

In addition, as the atmospheric damping coefficient becomes higher, the diffuse reflection quantity decreases. On the contrary, as the atmospheric damping coefficient becomes lower, the diffuse reflection quantity increases. Further, as the distance between the object and the ground surface becomes longer, the diffuse reflection quantity increases. On the other hand, the distance therebetween becomes shorter, the diffuse reflection quantity increases. As mentioned above, the diffuse reflection quantity depends upon the light quantity from the ground light source, the atmospheric damping coefficient and the distance between the object and the ground surface, and therefore, these are stored as parameters in the form of a table. Thus, by specifying parameters and by inputting a digitized angle, the diffuse reflection quantity the object surface receives with respect to the specified parameter and angle is readily obtainable only by referring to the table with no complicated calculation.

Furthermore, multiplying the two elements: the diffuse reflection quantity from the ground surface over the angular range of 0 to $\pi$, and by the object diffuse reflection coefficient, makes a luminous intensity component which develops the color of the object. On the other hand, the diffuse reflection, makes a luminous intensity component which develops the color of the ground light source on the object.

A third aspect of this invention is that, in the above-mentioned picture-drawing method, the diffuse reflection quantity stored in the form of a table is expressed as follows:

$$Table[\theta] = \frac{1}{3\pi}(-\pi\cos\theta + 2\tan^{-1}(\cot\theta)\cdot\cos\theta + 2\sin\theta)$$

and, said diffuse reflection quantity obtained from said table is expressed as follows:

$$\frac{L_g}{a_1 r_0} Table[\theta]$$

and, the object color developing object luminous intensity, which is obtained on the basis of the whole diffuse reflection quantity, the object diffuse reflection coefficient and the light quantity from the ground light source being one of the aforesaid parameters, is expressed as follows:

$$\frac{L_g}{a_1 r_0} \times [M_d M_s] \begin{bmatrix} Table[\theta] \\ 0 \end{bmatrix}$$

and further, the ground light source color developing object luminous intensity, which is obtained on the basis of the whole diffuse reflection quantity and the light quantity from the ground light source, is expressed as follows:

$$\frac{L_g}{a_1 r_0} \times Table[\theta]$$

where:
   $\theta$: an angle made between a unit normal vector $n_A$ of the object surface and a unit normal vector $n_g$ of the ground surface;
   $L_g$: a light quantity from the ground light source;
   $M_d$: a diffuse reflection coefficient of the object; and
   $M_s$: a specular reflection coefficient of the object.
   $a_1$: an atmospheric damping coefficient; and
   $r_0$: a distance between said object and said ground surface.

According to this invention, since the algorithm to be used is simple, the added calculation amount is due to the table referring time, several multiplications and one addition, and is extremely small as compared with the prior method in which a picture is drawn without taking the indirect reflection into consideration at all.

In accordance with a fourth aspect of this invention, there is provided a picture-drawing apparatus comprising a lookup table in which a diffuse reflection quantity, an object surface appearing in an application receives from a ground surface in accordance with angles made between a normal vector of the object surface and a normal vector of the ground surface, is previously stored in the form of a table in relation to the parameters such as the light quantity from the ground light source regarded as existing on the ground surface, the atmospheric damping coefficient and the distance between the object and the ground surface, means for obtaining the whole diffuse reflection quantity, the object surface receives from the ground surface over the angular range of 0 to $\pi$, from the lookup table by specifying one of the parameters, means for obtaining an object luminous intensity, which develops the color of the object, on the basis of the whole diffuse reflection quantity, the object diffuse reflection coefficient and the light quantity from the ground light source being one of the parameters, and means for obtaining an object luminous intensity, which develops the color of the ground light source, on the basis of the whole diffuse reflection quantity and the light quantity from the ground light source.

In this case, the application is a software which produces a picture drawn. For instance, the application is for a game, and the game signifies a game software which provides real-time picture drawing processing.

In accordance with a fifth aspect of this invention, there is provided a computer readable recording medium recording a program including a lookup table in which the diffuse reflection quantities, the object surface appearing in an application receives from the ground surface in accordance with the angles made between the normal vectors of the object surface and the normal vectors of the ground surface, are previously stored in the form of a table in relation to the parameters such as the light quantity from the ground light source regarded as existing on the ground surface, the atmospheric damping coefficient and the distance between the object and the ground surface, the program making a computer execute a step of obtaining the whole diffuse reflection quantity, the object surface receives from the ground surface over the angular range of 0 to $\pi$, from the lookup table by specifying one of the parameters, a step of obtaining an object luminous intensity, which develops the color of the object, on the basis of the whole diffuse reflection quantity, the object diffuse reflection coefficient and the light quantity from the ground light source being one of the parameters, and a step of obtaining an object luminous intensity, which develops the color of the ground light source, on the basis of the whole diffuse reflection quantity and the light quantity from the ground light source.

BRIEF DESCRIPTION OF THE DRAWINGS

The object and features of the present invention will become more readily apparent from the following detailed description of the preferred embodiments taken in conjunction with the accompanying drawings in which:

FIGS. 2A to 2E are illustrations of a picture of a spherical body (ball), and of these illustrations.

DETAILED DESCRIPTION OF THE INVENTION

Prior to describing embodiments of the present invention, a description will be made hereinbelow of the property of indirect reflection (reflected light) which constitutes a point of this invention.

Description of Property of Indirect Reflection

Light, when applied to an object, reflects, and among the reflection there are diffuse reflection and specular reflection.

The diffuse reflection is a phenomenon that the light striking on an object is once absorbed in the object to cause re-reflection. The characteristic of this reflection is that the color of the reflected light going out from the object turns into the color of the object and the reflected light advances in all the directions. On the other hand, the specular reflection is a phenomenon that the light striking on an object directly reflects. The characteristic of this reflection is that the color of the reflected light substantially equals the color of a light source and the reflected light advances only in a specific direction (the direction making the coincidence between the angle of incidence and the angle of reflection).

Description of Fundament of the Invention

A consideration is given through a simple algorithm to indirect reflection. Let it be assumed that various kinds of objects are placed on a wide plane such as a floor and a table. This wide plane will be referred hereinafter to as a ground surface. The ground surface is regarded as being sufficiently larger than the objects and is treated as an infinite plane. Each of the objects is regarded as receiving reflection (indirect reflection) from the ground surface in addition to the light from a light source (point light source). That is, the ground surface is considered as serving as a surface light source (which will be referred hereinafter to as a ground light source).

Figure 3:
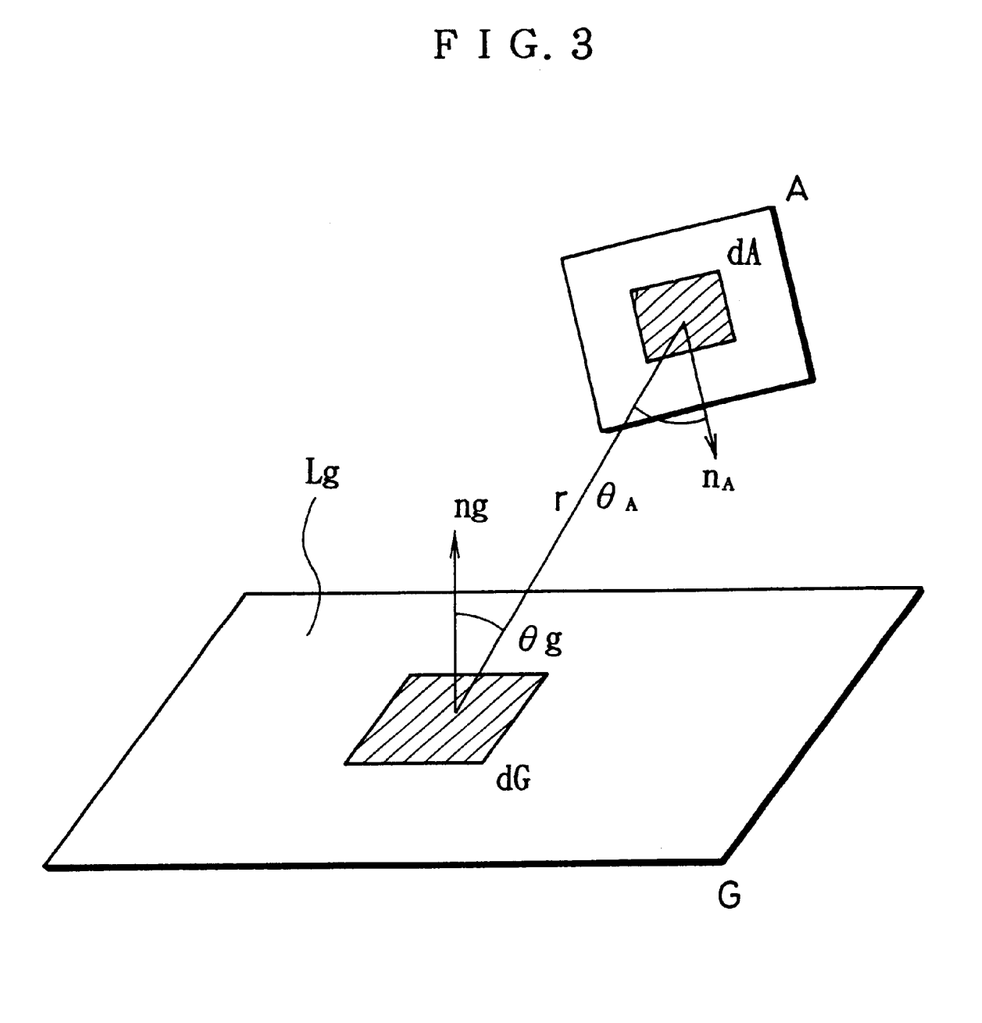
FIG. 3 is an illustration for describing the satisfaction of an equation for a diffuse reflection quantity I an object surface A receives from a ground surface G.

FIG. 3 illustrates the relationship between the ground surface regarded as a surface light source and an object placed on the ground surface with two elements. When the diffuse reflection quantity an object surface A receives a ground surface G is taken to be I (vector) and an element dA of the object surface A receives the light energy emitted from all the points of an element dG of the ground surface G, the diffuse reflection quantity I is given by the following equation (1).

$$I = \int_A \int_G \frac{\cos\theta_A \cos\theta_g}{\pi r^2} L_g \frac{1}{a_1 r} dG dA \qquad (1)$$

where:

$L_g$: a light quantity from the ground surface G;

$\theta_A$: an angle made between a unit normal vector $n_A$ of dA and a straight line connecting dA and dG; and $\theta_g$: an angle made between a unit normal vector $n_g$ of the ground surface G and the straight line connecting dA and dG.

This equation (1) signifies that the diffuse reflection quantity I the object surface A receives from the ground surface G is obtained by multiplying the sum total of the incident light from all the elements dG of the ground surface G by the reciprocal or inverse number of the product of the atmospheric damping coefficient a1 and the distance r between the object surface element dA and the ground surface element dG.

Assuming that the light quantity to be received and $n_A$ are constant within the object surface A and $L_g n_g$ is constant within the ground surface G, and considering that the ground surface G is an infinite plane, the above-mentioned equation (1) results in the following equation (2).

$$I = \frac{L_g}{3 a_1 \pi r_0}(-\pi\cos\theta + 2\tan^{-1}(\cot\theta)\cdot\cos\theta + 2\sin\theta) \qquad (2)$$

where:

$\theta$: an angle made between $n_A$ and $n_g$; and $r_0$: a distance between a representative point of A and G.

Figure 1A:
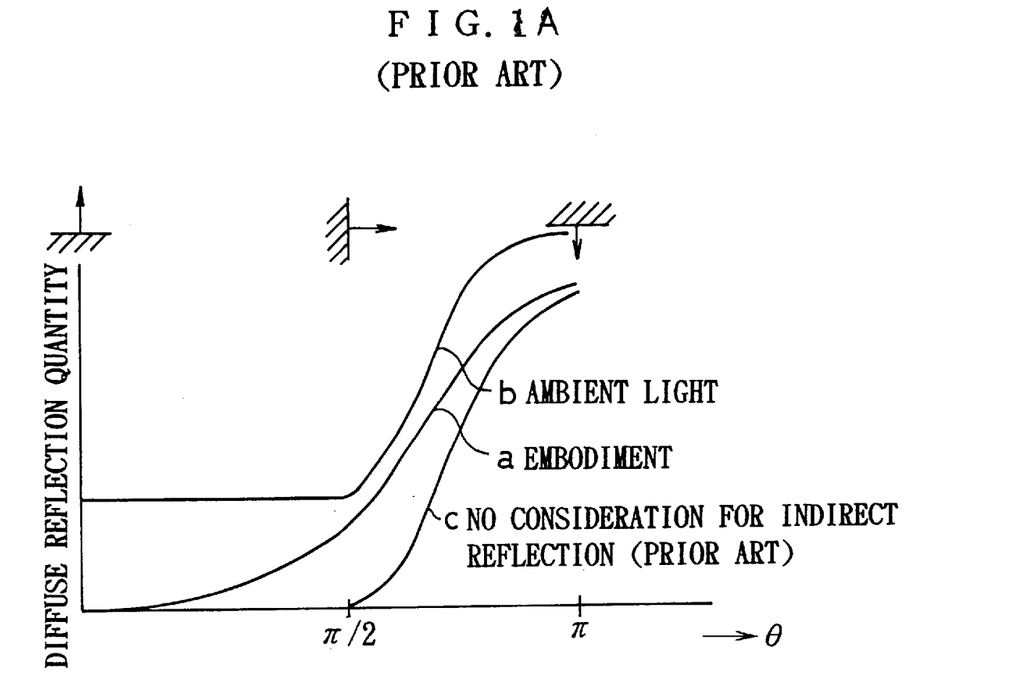
FIG. 1A is an illustration of a characteristic on a diffuse reflection quantity, an object surface receives from a ground surface, according to an embodiment of the present invention, in comparison with that of a prior art.
Figure 1B:
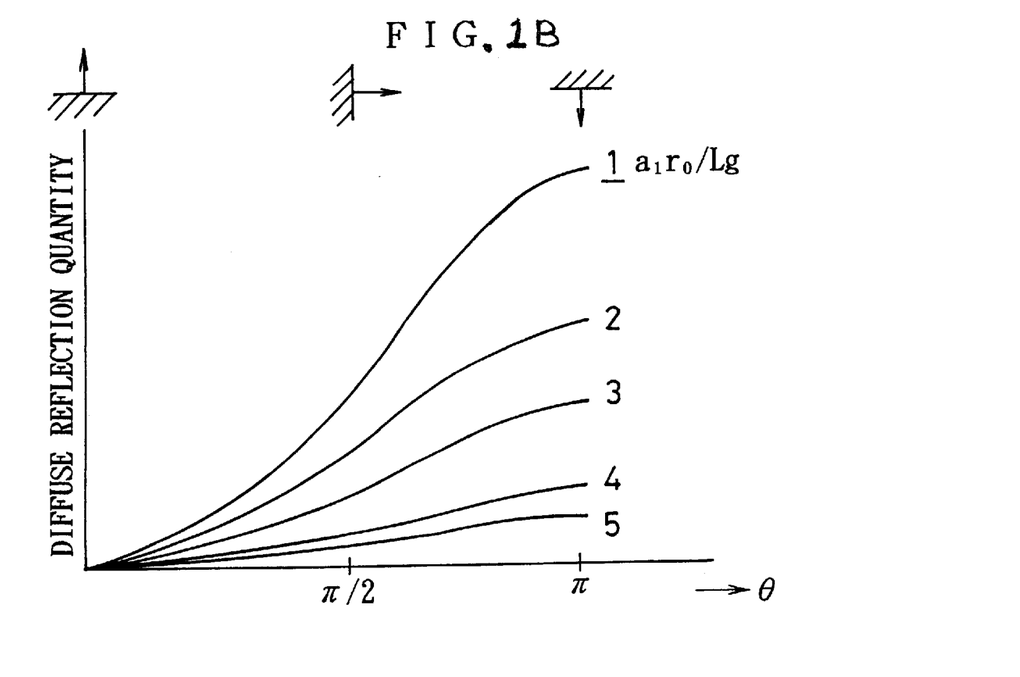
FIG. 1B is an illustration of a transitive characteristic of a diffuse reflection quantity relative to a parameter $(a_1 r_0/L_g)$.

FIG. 1B is a graphic illustration where I of the equation (2) is calculated with the reciprocal number of $L_g/(a_1 r_0)$ being used as a parameter. This illustration shows that, of the object surface, a portion ($\theta=\pi$) facing the ground surface shows the maximum light quantity, and as the angle $\theta$ made with respect to the ground surface reduces, the light quantity decreases, and the surface ($\theta=0$) opposite to the ground surface does not receive the light at all so that the light quantity reaches zero. Further, as $L_g$ increases, and as $a_1$ and $r_0$ decrease, the diffuse reflection quantity becomes larger.

FIG. 1A shows the difference in diffuse reflection quantity between this embodiment and a prior art. Although in this embodiment the diffuse reflection on the object surface from $\theta=0$ to $\theta=\pi$ is taken into consideration as indicated by character a, in the case of a prior art indicated by a character c and not considering the indirect reflection at all, the light quantity from $\theta=0$ to $\theta=\pi$ comes to zero, with the result that the semi-spherical surface facing the ground surface turns black. Further, for the ambient light, in the case of the prior art c, since a given light quantity is added over the range of $\theta=0$ to $\theta=\pi$, the semi-spherical surface facing the ground surface grows light. However, since the reflection quantities to the semi-spherical surface are all the same, the semi-spherical surface becomes unnatural and a dim color does not appear there.

In the actual picture-drawing processing, since $L_g$ and $a_1$ can be fixed, the equation (2) in this embodiment can be calculated in advance with respect to appropriately digitized $\theta$ to be stored as a lookup table. Accordingly, the equation (2) can be rewritten as follows through the use of the lookup table.

$$I = \frac{L_g}{r_0 a_1} Table[\theta] \qquad (3)$$

(where:

$$Table[\theta] = \frac{1}{3\pi}(-\pi\cos\theta + 2\tan^{-1}(\cot\theta)\cdot\cos\theta + 2\sin\theta)$$

Thus, the equation for the diffuse reflection quantity the object receives from the ground light source is attainable with a simple algorithm. Subsequently, the luminous intensity $I_{result}$ of the object surface due to the ground light source is calculated using this. The property of the ground light source shown here develops a dim color (the color of the object plus the color of the light source) irrespective of the property of the object. Accordingly, the equation for the luminous intensity of the object depending on the ground light source is expressible in a state of being divided into a term depending upon the property of the object and the property of the light source and a term depending upon only the property of the light source. The term depending upon the property of the object and the property of the light source is considered as a value obtained by multiplying $$\frac{L_g}{r_0 a_1} \times Table[\theta]$$

representative of the light quantity from the ground light source by the diffuse reflection coefficient $M_d$ indicative of the color of the object. Further, the term depending upon only the property of the light source is considered to be $$\frac{L_g}{r_0 a_1} \times Table[\theta]$$

representative of the light quantity from the ground light source.

In addition, the term indicative of the property of the light source is regarded as being the multiplication result of the luminous intensity $L_g$ of the ground light source and $$\frac{1}{r_0 a_1} Table[\theta] \left( \frac{L_g}{r_0 a_1} \times Table[\theta] \right).$$

In order to clearly represent that the ground light source develops a dim color, the terms representative of the property of the object are rewritten in the form of a matrix in the following Table 1 showing equations of the picture-drawing algorithm according to this embodiment together with comparative examples. In the Table 1, each of $L_g$, $L_p$ and $L_a$ is an element representative of the property of the light source, while a matrix $[M_d \, M_s]$ is an element representative of the property of the object. The minor or fine points (the terms of $a_1$, $r_0$) are omitted here as a matter of convenience.

TABLE 1

| Type of Light Source | Equation |
|---|---|
| Ground Light Source (g) (Embodiment) | $L_g \times [M_d M_s] \begin{bmatrix} Table[\theta] \\ 0 \end{bmatrix} + L_g \times Table[\theta]$ |
| Point Light Source (p) (Comparative Example 1) | $L_p \times [M_d M_s] \begin{bmatrix} \cos[\theta] \\ (\cos\Phi)^n \end{bmatrix}$ |
| Ambient Light (a) (Comparative Example 2) | $L_a \times [M_d M_s] \begin{bmatrix} 1 \\ 0 \end{bmatrix}$ | where:
- $L_g$: a light quantity from the ground surface G;
- $M_d$: a diffuse reflection coefficient representative of the color of the object; and
- $M_s$: a specular reflection coefficient, $M_s=1$ signifies a mirror finished surface while $M_s=0$ signifies a rough surface.

If the equation for the ground light source according to this embodiment in the Table 1 is developed, the following equation (4) is given.

$$L_g \times M_d \times Table[\theta] + L_g \times Table[\theta] \quad (4)$$

Thus, there is no specular reflection term therein. In the first term, the color of the object reflects the object, while in the second term the color of the light source reflects the object. Besides, the reason why zero is put in the equation expressed by the matrix is that specular reflection (the development of the color of the light source) occurs regardless of the property of the object.

Furthermore, expanding the equation for the point light source in the comparative example 1 produces the following equation (5).

$$L_p \times M_d \times \cos\theta + L_p \times M_s (\cos\phi)^n \quad (5)$$

In this equation, the first term is a diffuse reflection term while the second term is a specular reflection term. When the material of the object shows a gloss or luster, a highlight effect shows by the second term. This may be because the surface of the object reflects the light source through the specular reflection.

Likewise, developing the equation for the ambient light in the comparative 2 gives the following equation (6).

$$L_a \times M_d \quad (6)$$

That is, the specular reflection does not exist, and only the diffuse reflection term exists, thus depending upon the object. Accordingly, for instance, if the object is red, the object appears to be red.

From the Table 1 comparatively showing the equations for obtaining the luminous intensity of the object with the three light sources: the ground light source, the point light source and the ambient light, unlike the point light source and the ambient light, the ground light source supposed in this embodiment can develop a dim color irrespective of the property of the object.

The luminous intensity $I_{result}$ of the object surface is obtainable by the following equation (7) being the addition of the diffuse reflection of the light from the light source and the specular reflection to the light quantity I from the ground surface.

$$I_{result} = \text{ground light source} + \text{point light source} \quad (7)$$

Figure 2A:
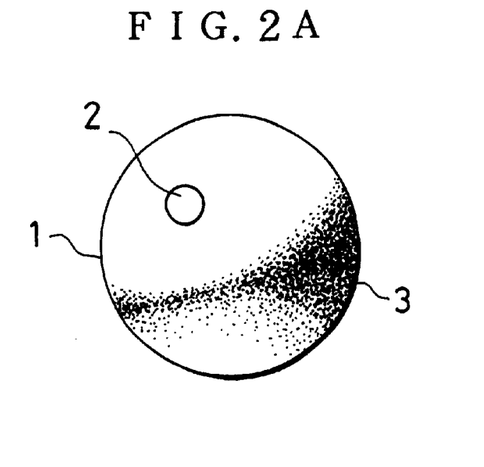
FIG. 2A shows a picture according to this embodiment.
Figure 2B:
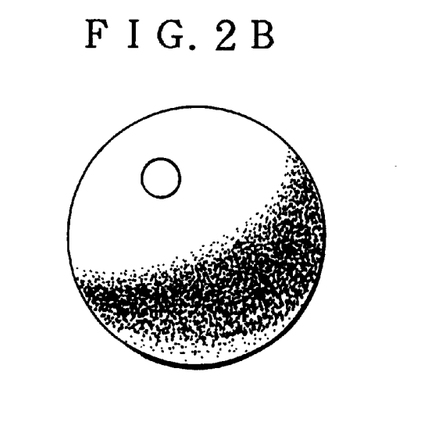
FIG. 2B shows a real picture.
Figure 2C:
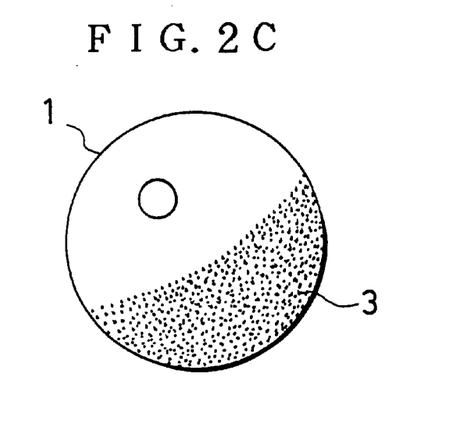
FIG. 2C is an illustration for explaining a Gauroud shading technique.
Figure 2D:
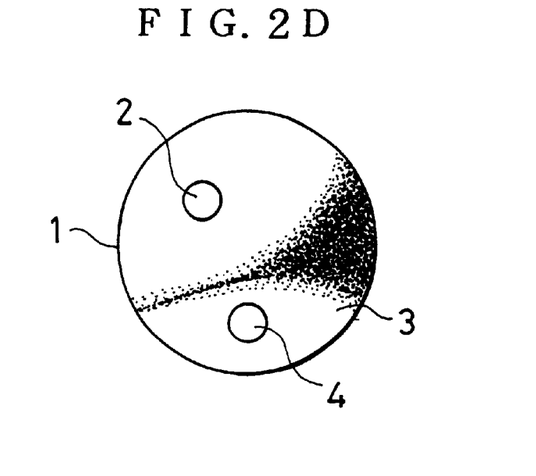
FIG. 2D is an illustration for explaining a shading technique in which a light source is located below.
Figure 2E:
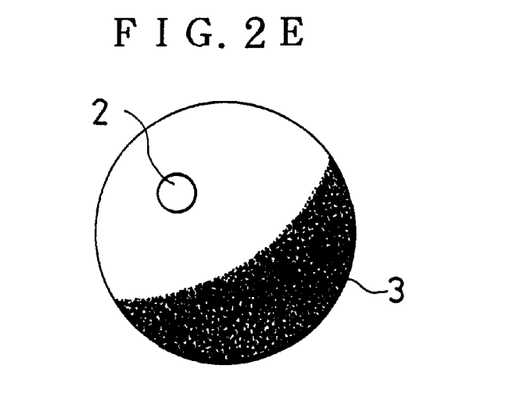
FIG. 2E is an illustration for describing a shading technique which does not taking indirect reflection into consideration.

In the case of using the ground light source, the ambient light is unnecessary (the ambient light is not used in the case shown in FIG. 2A). The use of the ambient light is for the purpose of preventing the surface, the light from the point light source does not strike on, from turning black. However, if the ground light source is put to use, the black surface does not almost appear, and therefore, the ambient light becomes unnecessary.

Figure 4:
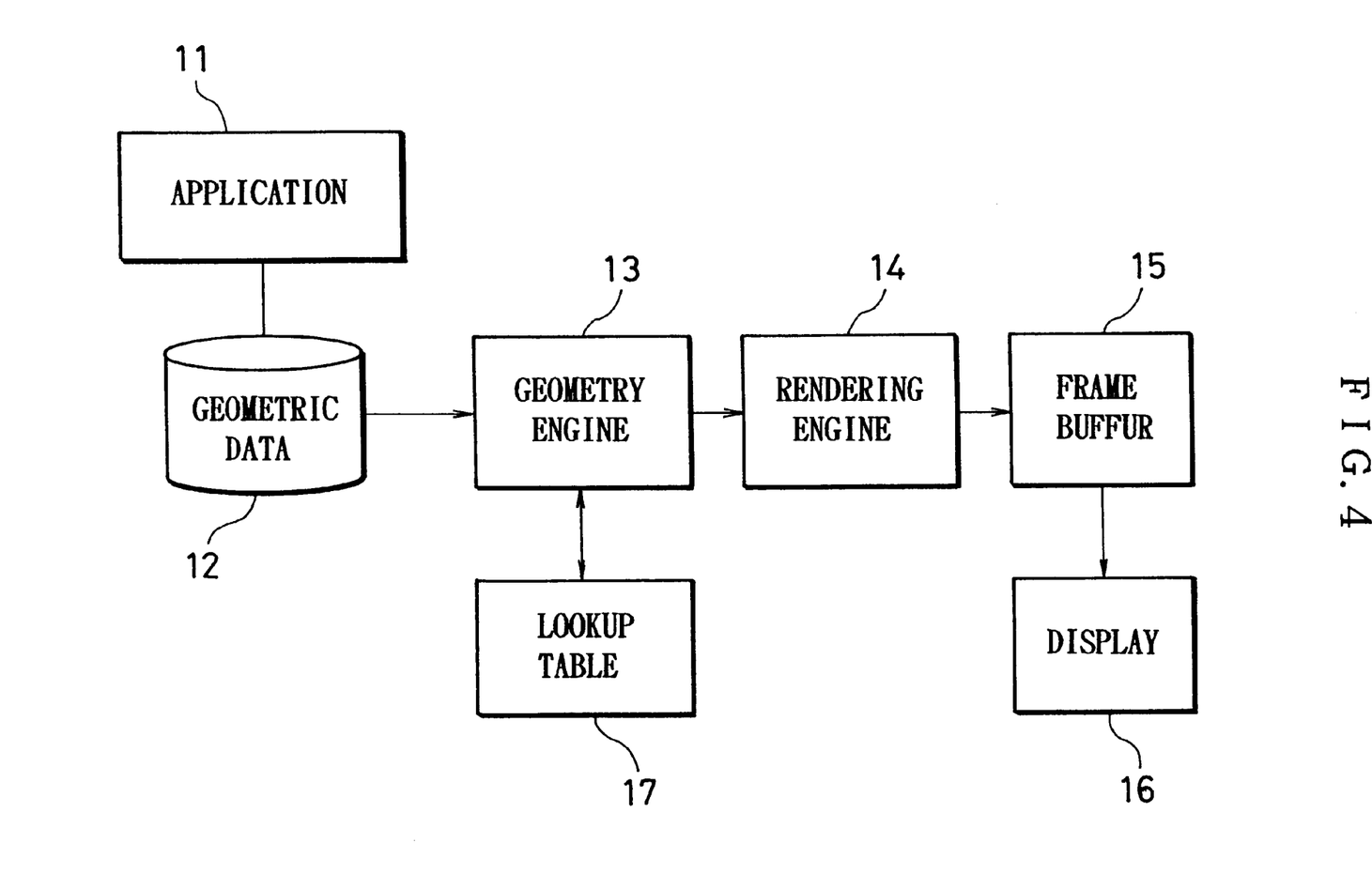
FIG. 4 is a block diagram showing a picture-drawing apparatus according to another embodiment of this invention.

FIG. 4 is a block diagram showing a picture-drawing apparatus for conducting graphics processing according to an embodiment of this invention.

In FIG. 4, geometric data 12 constituting a three-dimensional configuration is emitted from an application 11 to a geometry engine 13. The geometry engine 13 refers to a lookup table 17 to calculate the luminous intensity of an object surface on the basis of a light source, information about a material of an object, and others. Further, rendering engine 14 calculates a color on the basis of the luminous intensity information and writes it in a frame buffer 15, and further, sends it to a display 16 for displaying. A picture to be displayed thereon can express a diffuse reflection surface with a three-dimensional feeling.

The following Tables 2A, 2B and 2C show the comparison or difference between this embodiment and a prior art including the above-mentioned method which has conventionally employed for the games.

TABLE 2A

| Method | Outline of Algorithm |
|---|---|
| This Embodiment | Considering Diffuse, Specular Reflection + Indirect Light from Ground Surface. |
| Comparative Example 1: Prior Method for Game (Scattering, Specular and Ambient Light + Gauroud Shading) | Considering only one Reflection on Object Surface. Determining Diffuse, Specular Reflection on the Basis of only Positional Relationship between Surface and Light Source. Ambient Light is Constant. |

TABLE 2A-continued

| Method | Outline of Algorithm |
| --- | --- |
| Comparative Example 2: Ray Tracing | Recursively Tracing Specular Reflection on Object Surface and Transmission through Interior of Object. |
| Comparative Example 3: Radiosity | Regarding Object Surface as Light Source, and Solving Simultaneous Equations describing Equilibrium of its interaction. |
| Comparative Example 4: Environment Mapping | Storing Elements of Indirect Reflection as picture data, and Pasting Object Surface Reflection Image by Environment Mapping Technique. |

TABLE 2B

| Method | Three-Dimensional Feeling on Diffuse Surface |
| --- | --- |
| This Embodiment | Good Diffuse Surface with Three-Dimensional Feeling is Expressible owing to Indirect Reflection from Ground Surface. |
| Comparative Example 1: Prior Method for Game (Scattering, Specular and Ambient Light + Gauroud Shading) | Bad Three-Dimensional Feeling is Poor Because of No Consideration for Indirect Reflection. |
| Comparative Example 2: Ray Tracing | Bad Although Relatively Good Result is Obtainable in Terms of Transparent and Glossy Surface, Three-Dimensional Feeling on Diffuse Surface is Poor. |
| Comparative Example 3: Radiosity | Very Good Because of Directly Dealing with Indirect Reflection, Diffuse Surface with Excellent Three-Dimensional Feeling is Obtainable. |
| Comparative Example 4: Environment Mapping | Good If Using Texture Considering Indirect Reflection, Diffuse Surface with Three-Dimensional Feeling is Expressible. |

TABLE 2C

| Method | Processing Speed | Memory Capacity Needed |
| --- | --- | --- |
| This Embodiment | Very Good Use of Simple Algorithm | Table with Small Capacity |
| Comparative Example 1: Prior Method for Game (Scattering, Specular and Ambient Light + Gauroud Shading) | Very Good Use of Simple Algorithm | Very Good |
| Comparative Example 2: Ray Tracing | Bad Wide Tracing Range | Good Tracing Stack |
| Comparative Example 3: Radiosity | Very Bad Solving Large-volume Simultaneous Equations | Very Bad Solving Large-volume Simultaneous Equations |
| Comparative Example 4: | Good | Bad |

TABLE 2C-continued

| Method | Processing Speed | Memory Capacity Needed |
| --- | --- | --- |
| Environment Mapping | Use of Relatively Simple Algorithm | Use of Texture |

According to this embodiment, a new algorithm is developed in order to provide a three-dimensional feeling on a diffuse reflection surface as described above, and the following results are attainable.

(1) Consideration for Indirect Reflection from Ground Surface

By considering indirect reflection from a ground surface and further by introducing the concept of the indirect reflection not existing in the property of an object into a picture-drawing algorithm, the three-dimensional feeling on a diffuse reflection surface is more realistically expressible, so that a high-quality realistic picture is easily producible.

FIG. 2A shows a picture of a spherical body drawn through the use of the picture-drawing algorithm according to this embodiment. In this embodiment, the ground surface having a ground light source is captured as an infinite plane and it is assumed that the energy emitted from all points of the ground surface are received by the object surface. Accordingly, although not reaching the real picture shown in FIG. 2B, as compared with the pictures shown in FIGS. 2C to 2E and based upon the prior methods, this embodiment can develop a dim color and considerably and successfully create a three-dimensional feeling. Besides, when the material of the spherical object shows a gloss or luster, a highlight effect appears on a surface facing a light source as shown in the illustration.

(2) High-Speed Picture Drawing

As compared to the prior methods taken for games, in this embodiment, the above-mentioned equation (4) is added as a calculation to be made newly. Since the lookup table is calculated in advance and stored, the operation is simply by referring to the lookup table. Since $\theta$ and $r_0$ are generally obtained in the other processing, the added calculation amount is the table reference by $\theta$ plus the multiplication, and hence, is very small. As a result, the execution speed is high, that is, the picture drawing is possible at a speed equivalent to the method (scattering reflection, specular reflection and ambient light model plus Gauroud shading) which has been taken for games or the like.

(3) Necessary memory Capacity

The lookup table only requires an appropriately digitized size on $[0, \pi]$, and 256 bytes will do for the digitizing, and therefore, the added memory size necessary is very small. Accordingly, the picture drawing is possible with a memory capacity substantially equal to that in the method which has currently been employed for games or the like.

Although this embodiment does not particularly refer to the three primary colors (R, G, B), if the above-mentioned equations are replaced with a vector expression comprising the three elements (R, G and B), this embodiment is also applicable to color picture drawing.

That is, according to this invention, the ground light source is taken so that the color development occurs with both the color of an object and color of a light source, and therefore, the object develops a dim color irrespective of the property of the object, with the result that a picture with a three-dimensional feeling is easily drawable.

Furthermore, since consideration is given to the diffuse reflection quantity being the indirect reflection the object surface receives from the ground surface, as compared with the case of not considering the diffuse reflection quantity, a three-dimensional feeling can excellently be given to a diffuse reflection surface. In addition, the diffuse reflection quantity the object receives is calculated in advance in accordance with the angle made between the normal vectors of the object surface and the ground surface to create a lookup table, and therefore, the picture drawing is possible at a speed equivalent to that of the method (scattering reflection, specular reflection and ambient light model plus Gauroud shading) which has been employed for games or the like. Further, since in the actual picture drawing processing the parameters such as the light quantity from the ground surface and the atmospheric damping coefficient can be fixed, the number of sampling at the digitized points decreases, and hence, the picture drawing is feasible with a memory capacity equivalent to that in the method which has been used for games or the like.

Besides, since the algorithm used is simple, a picture with a three-dimensional feeling is drawable at a high speed as well as the prior art not considering the indirect reflection.

Still further, the addition of the hardware is only the lookup table and the existing memory is available for the lookup table in accordance with the digitizing status, and therefore, there is substantially no need to improve the hardware. Accordingly, the effects of this method are properly achievable with a simple structure.

Still further, if the application used is a game, particularly if being a home-use game, a picture with a three-dimensional feeling is drawable at a high speed without improving the hardware of a dedicated machine, a personal computer or the like.

Moreover, since a predetermined program is recorded on a recording medium, simply inserting the recording medium into a computer can realize a high-speed picture-drawing algorithm requiring less memory capacity.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A method of drawing a picture of an object, wherein a ground light source is regarded as a light source in order to produce indirect reflection occurring on said ground surface and said around light source is set on said ground surface, and regardless of the property of said object which receives said light from indirect reflection from said ground light source, said ground light source is made to show a property that color development of said object is made with a mixed color of a color of said object and a color of said ground light source, and said picture of said object is drawn in such a way that the color of said object is developed with dim color on the surface of said object, said surface which receives said indirect reflection.

2. A picture-drawing method of drawing a picture of an object on the basis of indirect reflection coming from a ground surface to said object, with a ground light source being regarded as existing on said ground surface and light from said ground light source is taken as said indirect reflection occurring on said ground surface, said method comprising:

a step of previously storing a diffuse reflection quantity, a surface of said object receives from said ground surface in relation to an angle made between a unit normal vector of said object surface and a unit normal vector of said ground surface in the form of a table in a manner of using a quantity of light emitted from said ground light source, an atmospheric damping coefficient, a distance between said object and said ground surface as parameters;

a step of obtaining the diffuse reflection quantity, said object surface receives from said ground surface over an angular range of 0 to $\pi$, from said table by designating said parameters;

a step of developing a color of said object on said object on the basis of the diffuse reflection quantity, an object diffuse reflection coefficient a step of developing a color of said ground light source on said object on the basis of the diffuse reflection quantity.

3. A method as defined in claim 2 wherein stored data of said diffuse reflection quantity which is previously stored in the form of a table is expressed as follows:

$$Table[\theta] = \frac{1}{3\pi}(-\pi \cos \theta + 2\tan^{-1}(\cot \theta) \cdot \cos \theta + 2 \sin \theta)$$

and, said diffuse reflection quantity obtained from said table is expressed as follows:

$$\frac{L_g}{a_1 r_0} Table[\theta]$$

and, an object luminous intensity, which develops said color of said object and which depends upon the diffuse reflection quantity and said object diffuse reflection coefficient:

$$\frac{L_g}{a_1 r_0} \times [M_d M_s] \begin{bmatrix} Table[\theta] \\ 0 \end{bmatrix}$$

and further, an object luminous intensity, which develops said color of said ground light source and which depends upon the diffuse reflection quantity is expressed as follows:

$$\frac{L_g}{a_1 r_0} \times Table[\theta]$$

where:
  $\theta$: an angle made between a unit normal vector of said object surface and a unit normal vector of the ground surface;
  $L_g$: a light quantity from said ground light source;
  $M_d$: a diffuse reflection coefficient of said object;
  $M_s$: a specular reflection coefficient of said object:
  $a_1$: an atmospheric damping coefficient; and
  $r_0$: a distance between said object and said ground surface.

4. An apparatus for drawing a picture of an object on the basis of indirect reflection coming from a ground surface to said object, with a ground light source being regarded as existing on said ground surface and light from said ground light source is taken as said indirect reflection occurring on said ground surface, said apparatus comprising:

a lookup table in which a diffuse reflection quantity, a surface of an object appearing in an application receives from said ground surface in accordance with an angle made between a unit normal vector of said object surface and a unit normal vector of said ground surface, is previously stored in the form of a table in relation to parameters at least including a light quantity from said ground light source, an atmospheric damping coefficient and a distance between said object and said ground surface;

a diffuse reflection module for obtaining the diffuse reflection quantity, said object surface receives from said ground surface over an angular range of 0 to π, from said lookup table by specifying said parameters;

a first luminous intensity module for obtaining an object luminous intensity, which develops a color of said object, on the basis of the diffuse reflection quantity and an object diffuse reflection coefficient; and a second luminous intensity module for obtaining an object luminous intensity, which develops a color of said ground light source, on the basis of the diffuse reflection quantity.

5. An apparatus as defined in claim 4, wherein said application is a game.

6. A computer readable recording medium recording a program for drawing a picture of an object on the basis of indirect reflection coming from a ground surface to said object, with a ground light source being regarded as existing on said ground surface and light from said ground light source is taken as said indirect reflection occurring on said ground surface, said program including a lookup table in which a diffuse reflection quantity, a surface of an object receives from said ground surface in accordance with an angle made between a unit normal vector of said object surface and a unit normal vector of said ground surface, is previously stored in the form of a table in relation to parameters at least including a light quantity from said ground light source, an atmospheric damping coefficient and a distance between said object and said ground surface, and said program making a computer execute:

a step of obtaining the diffuse reflection quantity, said object surface receives from said ground surface over an angular range of 0 to π, from said lookup table by specifying said parameters;

a step of obtaining an object luminous intensity, which develops a color of said object, on the basis of the diffuse reflection quantity an object diffuse reflection coefficient and a step of obtaining an object luminous intensity, which develops a color of said ground light source, on the basis of the diffuse reflection quantity.

* * * * *

UNITED STATES PATENT AND TRADEMARK OFFICE
CERTIFICATE OF CORRECTION

PATENT NO. : 6,329,988 B1
DATED : December 11, 2001
INVENTOR(S) : Hiroyuki Watanabe and Mitsuhiro Shibuya It is certified that error appears in the above-identified patent and that said Letters Patent is hereby corrected as shown below:

Column 13,
Line 47, "around" should read -- ground --.

Column 14,
Line 2, "using" should read -- using at least --.
Line 21, "cos $\theta$)" should read -- cos $\theta$ --.

Column 16,
Line 18, "quantity" should read -- quantity an --.

Signed and Sealed this

Twenty-first Day of May, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.   : 6,329,988 B1
DATED        : December 11, 2001
INVENTOR(S)  : Hiroyuki Watanabe and Mitsuhiro Shibuya It is certified that error appears in the above-identified patent and that said Letters Patent is hereby corrected as shown below:

Column 13,
Line 47, "around" should read -- ground --.

Column 14,
Line 2, "using" should read -- using at least --.
Line 21, "cos $\theta$)" should read -- cos $\theta$ --.

Column 16,
Line 18, "quantity" should read -- quantity and --.

This certificate supersedes Certificate of Correction issued May 21, 2002.

Signed and Sealed this

Twenty-fourth Day of September, 2002

*Attest:*

*Attesting Officer*

JAMES E. ROGAN
*Director of the United States Patent and Trademark Office*